US012627611B2

(12) United States Patent
Nakata

(10) Patent No.: US 12,627,611 B2
(45) Date of Patent: May 12, 2026

(54) COMMUNICATION DEVICE, LINE DELAY TIME ESTIMATION METHOD, AND LINE DELAY TIME ESTIMATION PROGRAM

(71) Applicant: DENSO CORPORATION, Kariya-city (JP)

(72) Inventor: Tsuneo Nakata, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 26 days.

(21) Appl. No.: 18/764,422

(22) Filed: Jul. 5, 2024

(65) Prior Publication Data

US 2025/0023827 A1 Jan. 16, 2025

(30) Foreign Application Priority Data

Jul. 11, 2023 (JP) .................................. 2023-113756

(51) Int. Cl.
*H04L 47/283* (2022.01)
*H04L 47/30* (2022.01)

(52) U.S. Cl.
CPC ............ *H04L 47/283* (2013.01); *H04L 47/30* (2013.01)

(58) Field of Classification Search
CPC ... H04L 47/283; H04L 47/30; H04L 43/0852; H04L 43/0876
See application file for complete search history.

(56) References Cited

U.S. PATENT DOCUMENTS 8,923,270 B2 12/2014 Lee et al.
2019/0059037 A1* 2/2019 Nakata .................. H04L 45/124

OTHER PUBLICATIONS

U.S. Appl. No. 18/764,425, filed Jul. 5, 2024, Tsuneo Nakata.

* cited by examiner

*Primary Examiner* — Abdulkader M Alriyashi
(74) *Attorney, Agent, or Firm* — Harness, Dickey & Pierce, P.L.C.

(57) ABSTRACT

By a communication device, a line delay time estimation method, a non-transitory computer-readable storage medium storing a line delay time estimation program, a communication packet is accumulated, a data amount of the communication packet is monitored, and a residence time, which is a duration and for which the communication packet remains in a transmission buffer, is estimated as an upstream buffer delay time from the communication device to a counterpart device.

10 Claims, 6 Drawing Sheets

FIG. 2 b(t1)

TRANSMISSION BUFFER b(t2)

TRANSMISSION BUFFER

COMMUNI-
CATION
PACKET

COMMUNI-
CATION
PACKET

B1

UPSTREAM WIRELESS
LINE BANDWIDTH

B2(>B1)

UPSTREAM PATH BAND
WIDTH EXCLUDING
UPSTREAM WIRELESS LINE

COMMUNICATION DEVICE, LINE DELAY TIME ESTIMATION METHOD, AND LINE DELAY TIME ESTIMATION PROGRAM

CROSS REFERENCE TO RELATED APPLICATION

The present application claims the benefit of priority from Japanese Patent Application No. 2023-113756 filed on Jul. 11, 2023. The entire disclosure of the above application is incorporated herein by reference.

TECHNICAL FIELD

The present disclosure relates to a communication device, a line delay time estimation method, and a non-transitory computer-readable storage medium storing a line delay time estimation program.

BACKGROUND

In packet communication, a communication device transmits a communication packet to a counterpart device, and upon receiving the communication packet from the communication device, the counterpart device transmits a reception confirmation packet for the communication packet to the communication device. For example, according to a technology of a comparative example, a communication device calculates a round-trip time (hereinafter referred to as RTT) based on a transmission queue length, a transmission delay, and a reception time of a reception confirmation packet, and calculates the queue length of the entire communication network.

SUMMARY

By a communication device, a line delay time estimation method, a non-transitory computer-readable storage medium storing a line delay time estimation program, a communication packet is accumulated, a data amount of the communication packet is monitored, and a residence time, which is a duration and for which the communication packet remains in a transmission buffer, is estimated as an upstream buffer delay time from the communication device to a counterpart device.

BRIEF DESCRIPTION OF THE DRAWINGS

FIG. 2 is a diagram showing upstream buffer delay time and downstream buffer delay time.

DETAILED DESCRIPTION

Figure 1:
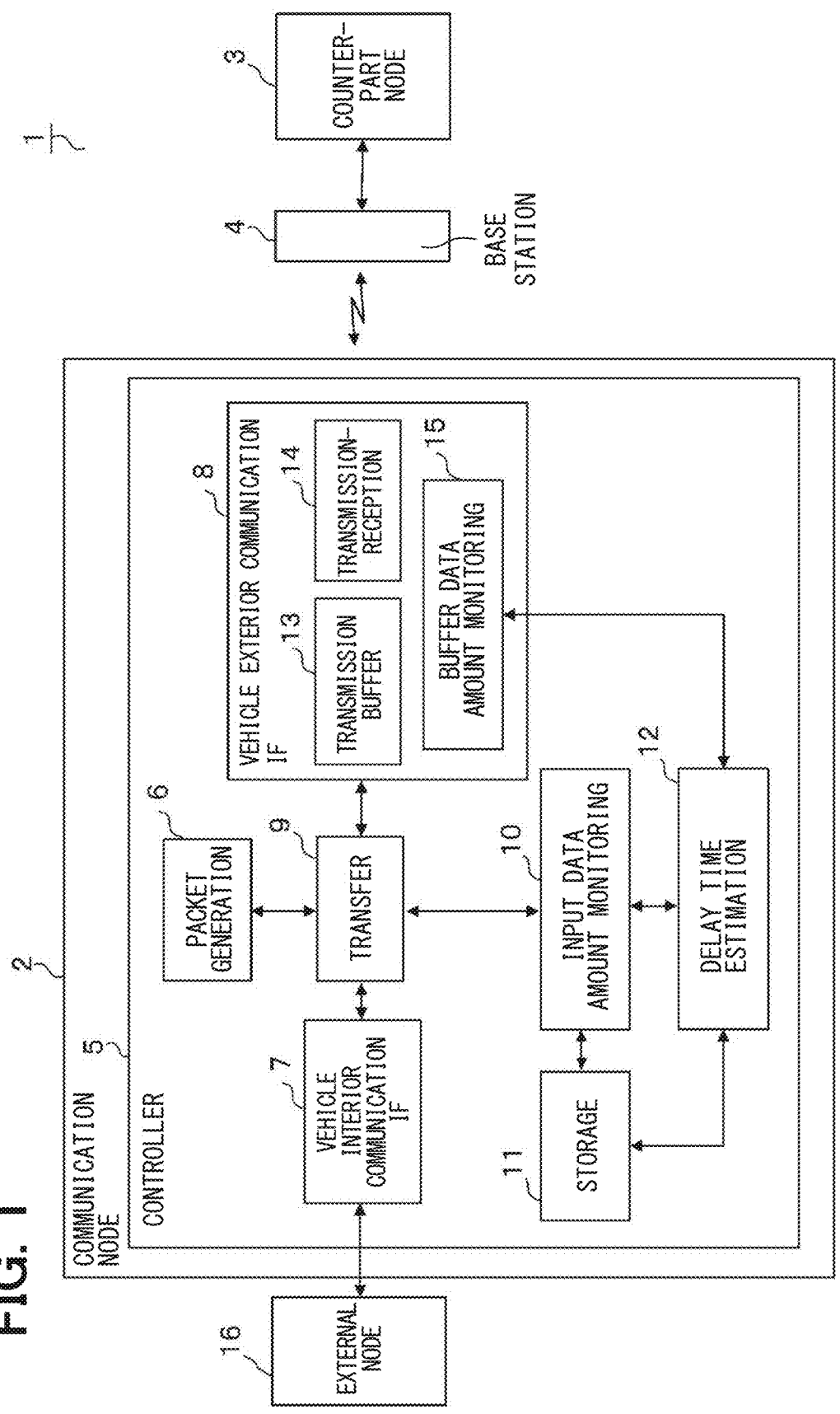
FIG. 1 is a functional block diagram showing an overall configuration according to an embodiment.

In a method of the comparative example, although the queue length of the entire communication network is calculated, it is not possible to separately estimate an upstream buffer delay time from the communication device to the counterpart device or a downstream buffer delay time from the counterpart device to the communication device. Further, the timing at which the communication device calculates the RTT is after receiving a reception confirmation packet from the counterpart device, and the RTT can be calculated only after receiving the reception confirmation packet from the counter device. Therefore, when the communication network is a cellular line, it takes several tens to several hundreds of milliseconds from the transmission of the communication packet until the RTT is calculated. As a result, for example, a situation is assumed in which the communication device is mounted on a vehicle and moves at high speed. The time required to calculate the RTT becomes approximately the same as the fluctuation period of the line condition. As the result, a feedback control becomes unstable.

Examples of the present disclosure provide a communication device, a line delay time estimation method, a non-transitory computer-readable storage medium storing a line delay time estimation program capable of appropriately estimating one-way line delay time.

According to one example embodiment, a communication device is configured to transmit a communication packet to a counterpart device. A transmission buffer is configured to accumulate the communication packet. A buffer data amount monitoring unit is configured to monitor a data amount of the communication packet accumulated in the transmission buffer. An input data amount monitoring unit is configured to monitor the data amount of the communication packet input to the transmission buffer in a predetermined period. A delay time estimation unit is configured to estimate, as an upstream buffer delay time from the communication device to the counterpart device, a residence time, which is a duration and for which the communication packet input to the transmission buffer remains in the transmission buffer, based on a data amount of the communication packet accumulated in the transmission buffer at a first time, a data amount of the communication packet input to the transmission buffer during a period from the first time to a second time, and a data amount of the communication packet accumulated in the transmission buffer at the second time.

The residence time of the communication packet input to the transmission buffer is estimated as the upstream buffer delay time based on the data amount of the communication packet accumulated in the transmission buffer at the first time, the data amount of the communication packet input to the transmission buffer during the period from the first time to the second time, and the data amount of the communication packets accumulated in the transmission buffer at the second time. It is possible to appropriately estimate the line delay time in the upstream direction from the communication device to the counterpart device.

Hereinafter, an embodiment in which the present disclosure is applied to a communication node mounted on, for example, a vehicle will be described with reference to the drawings. As shown in FIG. 1, a communication system 1 is configured to communicate data between a communication node 2 (corresponding to a communication device) and a counterpart node 3 (corresponding to a counterpart device) via a base station 4. The communication node 2 and the base station 4 perform data communication via a wireless line. The data communication between the counterpart node 3 and the base station 4 is performed via a wired line. The data communication between the communication node 2 and the counterpart node 3 is performed via the base station 4. The data communication complies with the TCP/IP (Transmission Control Protocol/Internet Protocol) communication protocol. The communication node 2 transmits a communication packet to the base station 4 via a wireless line. The base station 4 transmits the communication packet received from the communication node 2 to the counterpart node 3 via the wired line. The counterpart node 3 transmits the reception confirmation packet for the communication packet to the base station 4 via the wired line. The base station 4 transmits the reception confirmation packet received from the counterpart node 3 to the communication node 2 via the wireless line.

Figure 2:
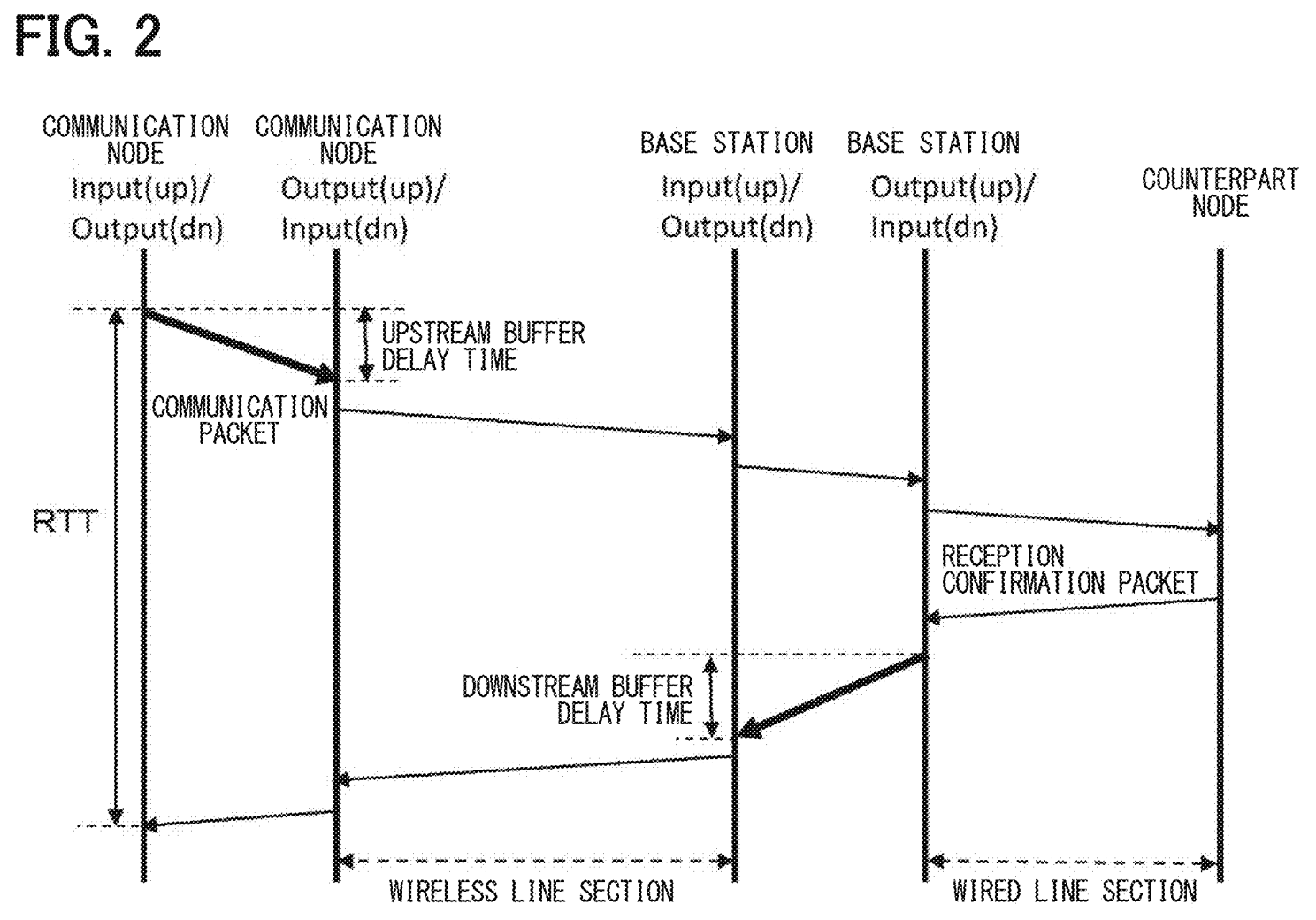

As shown in FIG. 2, transmission of the communication packet from the communication node 2 to the counterpart node 3 via the base station 4 is an upstream data transmission. A speed at which communication packets are transmitted from the communication node 2 to the wireless line depends on a wireless environment, and a time at which the communication packets remain in the communication node 2 occurs as an upstream buffer delay time (corresponding to an upstream line delay time). The transmission of the reception confirmation packet from the counterpart node 3 to the communication node 2 via the base station 4 is a downstream data transmission. A speed at which the delivery confirmation packet is transmitted from the base station 4 to the wireless line depends on the wireless environment, and a time at which the reception confirmation packet remains in the base station 4 occurs as a downstream buffer delay time (corresponding to a downstream line delay time). The upstream buffer delay time and the downstream buffer delay time vary depending on the wireless environment, and are relatively short when the wireless environment is relatively good, and are relatively long when the wireless environment is relatively poor.

The communication node 2 transmits to, the counterpart node 3, travel control data relating to travel control such as vehicle speed, acceleration/deceleration, sharp turns, travel route, and fuel efficiency. The counterpart node 3 is capable of data communication with a plurality of communication nodes 2 via the wireless line, and is, for example, a server having a function of executing a statistical process on the travel control data for an unspecified number of vehicles. When the counterpart node 3 receives the travel control data from each of the communication nodes 2 mounted on an unspecified number of vehicles, the counterpart node 3 executes the statistical process on the received travel control data. The data transmitted and received between the communication node 2 and the counterpart node 3 may be data other than the above-described travel control data, and may be data used for other purposes.

The communication node 2 includes a controller 5 that controls the operation of the entire nodes. The controller 5 is provided by a microcomputer having a CPU (i.e., Central Process Unit), a ROM (i.e., Read Only Memory), a RAM (i.e., Random Access Memory), and an I-O (i.e., Input-Output). A function provided by the controller 5 can be provided by software stored in a tangible memory device and a computer that executes the software, only software, only hardware, or a combination thereof. For example, when the controller 5 is provided by an electronic circuit that is hardware, the controller 5 can be provided by a digital circuit including a large number of logic circuits or an analog circuit. When the controller 5 executes the program stored in the non-transitory tangible storage medium, a process corresponding to the program is executed, and a method corresponding to the program is executed.

The controller 5 includes, for each function, a packet generation unit 6, a vehicle interior communication interface unit 7, a vehicle exterior communication interface unit 8, a transfer unit 9, an input data amount monitoring unit 10, a storage 11, and a delay time estimation unit 12. The vehicle exterior communication interface unit 7 includes a transmission buffer 13, a transmission-reception unit 14, and a buffer data amount monitoring unit 15. Each of these units 6 to 15 executes a RTT estimation program and performs a RTT estimation method.

The packet generation unit 6 generates a communication packet according to the execution of the application by the controller 5, and outputs the generated communication packet to the transfer unit 9. When the vehicle interior communication interface unit 7 receives a communication packet from an external node 16 (corresponding to an external device), the vehicle interior communication interface unit 6 outputs the received communication packet to the transfer unit 9. When the transfer unit 9 receives the communication packet from the packet generation unit 6 or the vehicle interior communication interface unit 7, the transfer unit 9 transfers the received communication packet to the vehicle exterior communication interface unit 8.

In the vehicle exterior communication interface unit 8, when the communication packet is transferred from the transfer unit 9, the transmission buffer 13 stores the transferred communication packet. The transmission-reception unit 14 transmits the communication packet accumulated in the transmission buffer 13 to the counterpart node 3 via the base station 4, and receives the reception confirmation packet for the communication packet from the counter node 3 via the base station 4. The buffer data amount monitoring unit 15 monitors the amount of data of communication packets accumulated in the transmission buffer 13, and outputs the accumulated data amount indicating the amount of data of communication packets accumulated in the transmission buffer 13 to the delay time estimation unit 12.

The input data amount monitoring unit 10 monitors the amount of data of communication packets input from the transfer unit 9 to the transmission buffer 13, and outputs the input data amount indicating the amount of data of communication packets input from the transfer unit 9 to the transmission buffer 13 to the storage 11 and the delay time estimation unit 12.

When the storage 11 receives the input data amount from the input data amount monitoring unit 10, the storage 11 manages and stores the input data amount in chronological order. The delay time estimation unit 12 receives the amount of accumulated data from the buffer data amount monitoring unit 15. When the input data amount is input from the input data amount monitoring unit 10, the delay time estimation unit 12 estimates a residence time, which is a duration and for which the communication packet input to the transmission buffer 13 remains in the transmission buffer 13, as the upstream buffer delay time based on the input accumulation data amount and the input data amount.

Figure 3:
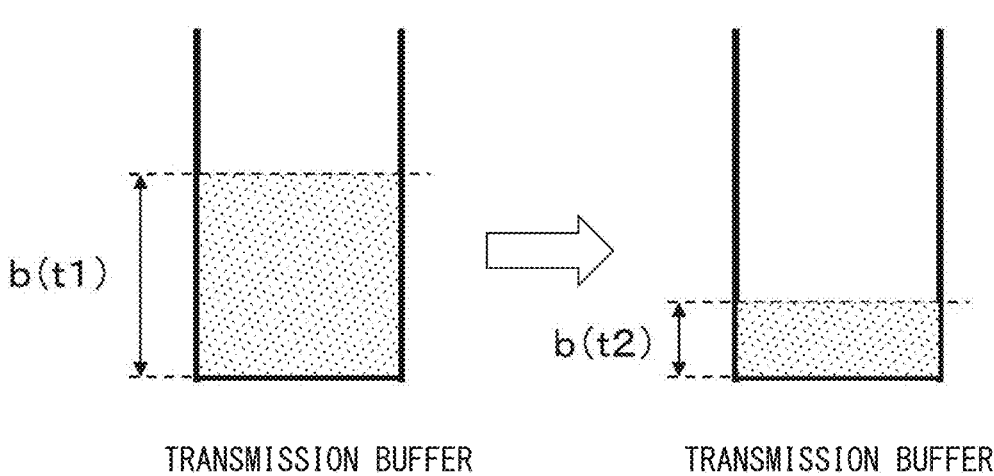
FIG. 3 is a diagram showing a transition of the amount of data stored in a transmission buffer.

As shown in FIG. 3, it is assumed that the data amount of communication packets accumulated in the transmission buffer 13 at a time t1 is data amount b(t1), the data amount of the communication packets input to the transmission buffer 13 during the period from the time t1 to a time t2 is the data amount P, and the data amount of communication packets accumulated in the transmission buffer 13 at time t2 is data amount b(t2). The delay time estimation unit 12 estimates the residence time, which is a duration and for which the communication packet input to the transmission buffer 13 remains in the transmission buffer, as the upstream buffer delay time using the following calculation equation.

$$\text{Upstream buffer delay time} = (t2 - t1) \times b(t1) / \{b(t1) - b(t2) - P\}$$

Here, a wireless line transmission rate is expressed as bellow.

$$\text{Wireless line transmission rate} = \{b(t1) - b(t2) - P\} / (t2 - t1)$$

If the transmission buffer 13 does not become empty between the time t1 and the time t2, a relation of the wireless line transmission rate is obtained as bellow. Wireless line transmission rate=Line bandwidth Further, the delay time estimation unit 12 estimates the downstream buffer delay time in addition to estimating the upstream buffer delay time. That is, the delay time estimation unit 12 obtains the RTT, which is the sum of the upstream line delay and the downstream line delay. Here, when the delay time that is not affected by fluctuation in the wireless environment in the communication line is set to a default delay time, the following relation is established.

RTT=Upstream buffer delay time+Downstream buffer delay time+Default delay time

The delay time estimation unit 12 estimates the downstream buffer delay time by the following calculation equation.

Downstream buffer delay time =

$$RTT - (\text{Upstream buffer delay time} + \text{Default delay time})$$

The default delay time is a time that can be calculated by premeasurement based on processing performances of the base station 4, the counter node 3, and the communication node 2, and the like, and the following relation of the default delay time is established.

Default delay time=Time required for data processing in upstream direction at base station 4+Data communication time from base station 4 to counterpart node 3+Time required for data processing at counterpart node 3+Data communication time from counterpart node 3 to base station 4 and Time required for data processing in downstream direction at communication node 2

Further, the delay time estimation unit 12 compares the fluctuation in the upstream buffer delay time with the fluctuation in the RTT, and determines whether the upstream wireless line is affecting the rate limit of the entire communication line. The delay time estimation unit 12 determines that the upstream wireless line is affecting the rate limit of the entire communication line during a period in which the fluctuation of the RTT follows the fluctuation of the upstream buffer delay time. That is, the delay time estimation unit 12 identifies the upstream wireless line as a bottleneck section of the entire communication line. The delay time estimation unit 12 can determine that suppressing delay in the transmission buffer 13 is effective in improving the RTT by identifying the uplink wireless line as the bottleneck section of the entire communication line. In this case, the delay time estimation unit 12 can determine that the RTT can be adjusted by adjusting the amount of data of the communication packets input to the transmission buffer 13 and adjusting the input rate to the transmission buffer 13. The delay time estimation unit 12 can reduce the upstream buffer delay time and the RTT by reducing the input rate to the transmission buffer 13.

On the other hand, the delay time estimation unit 12 determines that the upstream wireless line is not affecting the rate limit of the entire communication line during a period in which the fluctuation of the RTT does not follow the fluctuation of the upstream buffer delay time. That is, the delay time estimation unit 12 determines that the upstream wireless line is not the bottleneck section of the entire communication line. By determining that the uplink wireless link is not the bottleneck section of the entire communication link, the delay time estimation unit 12 can determine that suppressing delay in the transmission buffer 13 is not effective in improving the RTT. In this case, the delay time estimation unit 12 can determine that the RTT cannot be adjusted even when the data amount of the communication packets input to the transmission buffer 13 is adjusted. Thereby, it is possible to prevent the situation in which the RTT is adjusted meaninglessly.

Figure 4:
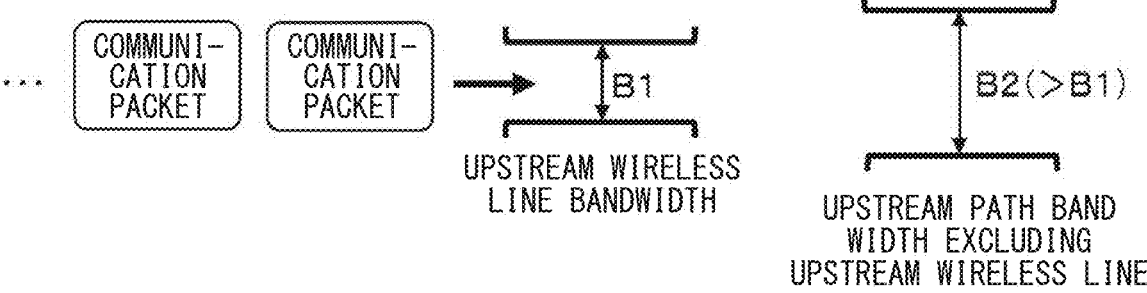
FIG. 4 is a diagram illustrating an upstream communication path.
Figure 5:
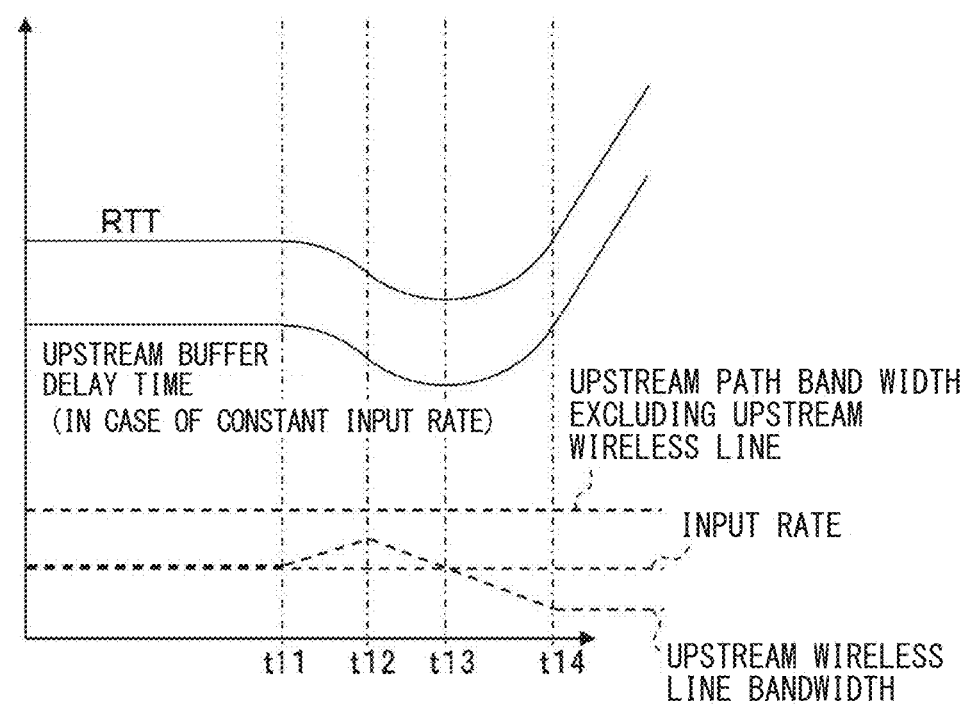
FIG. 5 is a diagram illustrating a state in which an upstream wireless line affects a rate limit of the entire communication line.

As shown in FIG. 4 and FIG. 5, when a bandwidth of the upstream path excluding the upstream wireless line in the upstream communication path is larger than a bandwidth of the upstream wireless line (B2>B1), the fluctuation of the RTT follows the fluctuation of the upstream buffer delay time. Therefore, the delay time estimation unit 12 determines that the upstream wireless line is the bottleneck section of the entire communication line during the period in which the fluctuation of the RTT follows the fluctuation of the upstream buffer delay time. In a section (t11 to t12) where the bandwidth of the upstream wireless line increases, the upstream buffer delay time and RTT tend to decrease, and in a section (t12 to t14) where the bandwidth of the upstream wireless line decreases, the upstream buffer delay time and RTT tend to increase.

Figure 6:
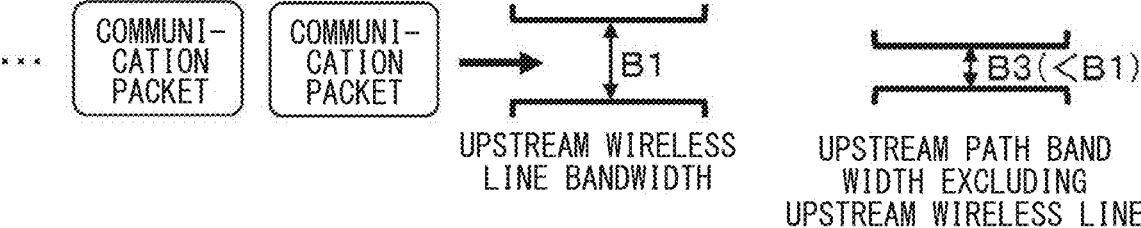
FIG. 6 is a diagram illustrating the upstream communication path.
Figure 7:
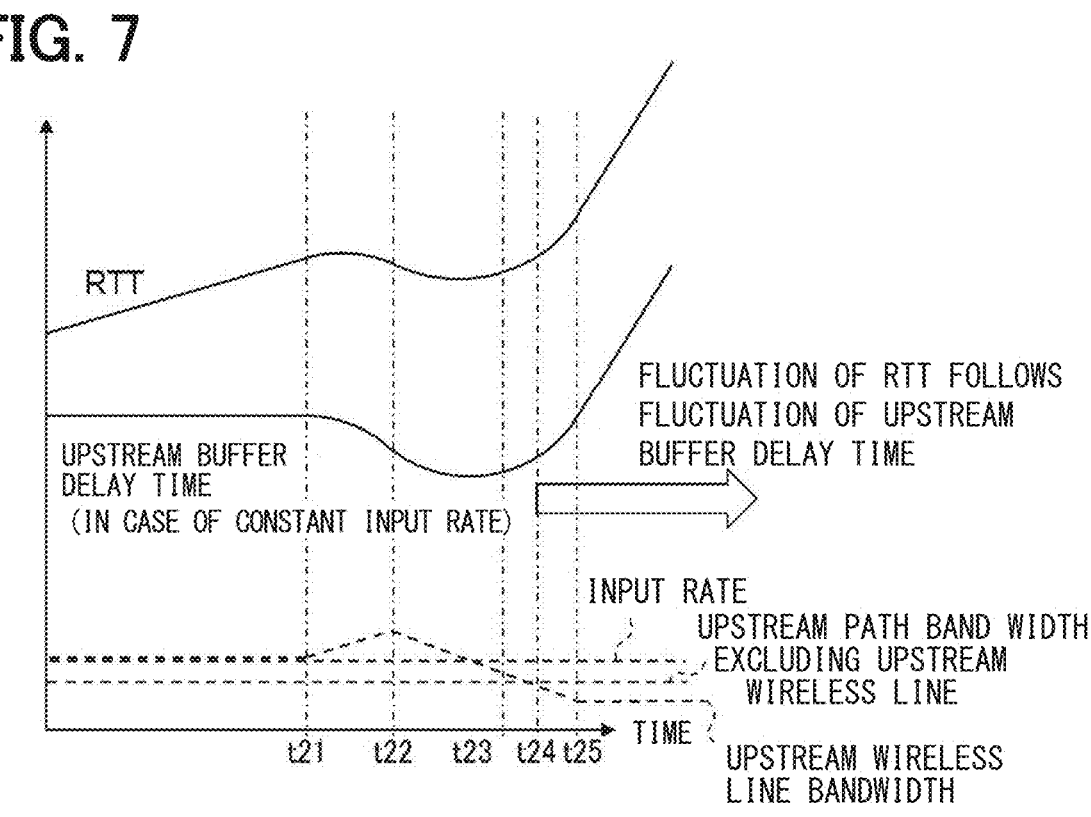
FIG. 7 is a diagram illustrating a state in which the upstream wireless line does not affect the rate limit of the entire communication line.

On the other hand, as shown in FIG. 6 and FIG. 7, when the bandwidth of the upstream path excluding the upstream wireless line in the upstream communication path is smaller than a bandwidth of the upstream wireless line (B3<B1), the fluctuation of the RTT does not follow the fluctuation of the upstream buffer delay time. Therefore, during the period in which the RTT fluctuation does not follow the fluctuation in the upstream buffer delay time, the delay time estimation unit 12 identifies the upstream path, excluding the upstream wireless line, as the bottleneck section of the entire communication line. In this case too, in a section (t21 to t22) where the bandwidth of the upstream wireless line increases, the upstream buffer delay time and RTT tend to decrease, and in a section (t22 to t25) where the bandwidth of the upstream wireless line decreases, the upstream buffer delay time and RTT tend to increase. Furthermore, when the relationship between the bandwidth of the upstream path excluding the upstream wireless line and the bandwidth of the upstream wireless line is reversed and the bandwidth of the upstream path excluding the upstream wireless line becomes larger than the bandwidth of the upstream wireless line (t24), from this point onwards, the fluctuation of RTT follows the fluctuation of the upstream buffer delay time.

Next, the process of the above configuration will be described with reference to FIGS. 8 to 10. Here, an upstream buffer delay time estimation process for estimating the upstream buffer delay time, a downstream buffer delay time estimation process for estimating the downstream buffer delay time, and an upstream wireless line influence determination process for determining the influence of the upstream wireless line will be described.

Figure 8:
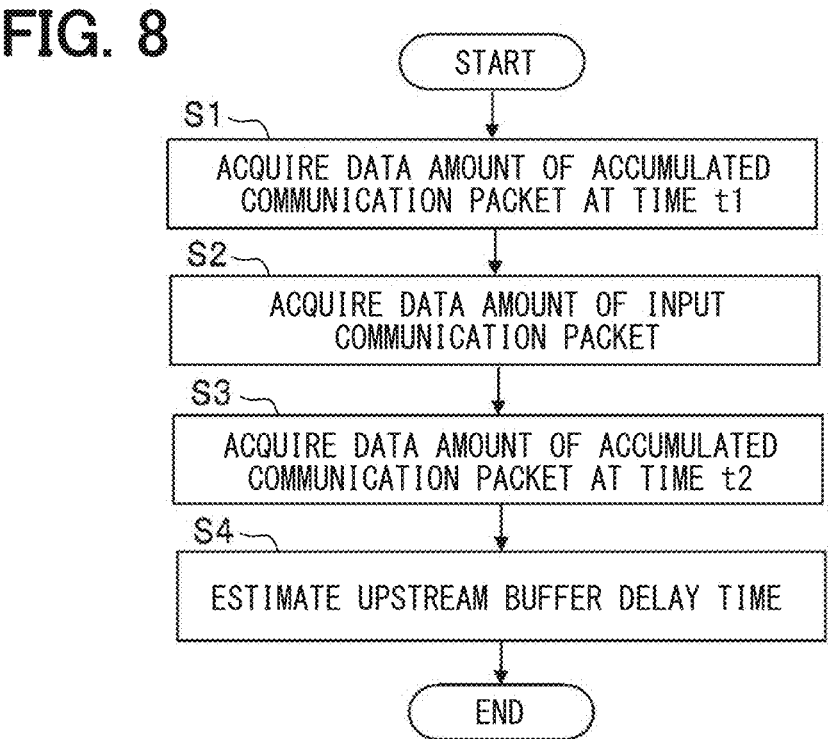
FIG. 8 is a flowchart showing an estimation process of the upstream buffer delay time.

(1) Estimation Process for Upstream Buffer Delay Time (See FIG. 8)

When the controller 4 starts the estimation process of the upstream buffer delay time, it sets a predetermined time as the time t1 and acquires the data amount of communication packets accumulated in the transmission buffer 13 at the time t1 (S1, corresponding to a first accumulation data amount acquisition process). The controller 4 determines that a time after a predetermined period from the time t1 is a time t2, and acquires the data amount of communication packets input to the transmission buffer 13 during the period from the time t1 to the time t2 (S2, corresponding to an input data amount acquisition process). The controller 4 acquires the data amount of communication packets accumulated in the transmission buffer 13 at the time t2 (S3, corresponding to a second accumulation data amount acquisition process).

The controller 4 estimates the upstream buffer delay time by the above-described calculation equation based on the data amount of the communication packets accumulated in the transmission buffer 13 at the time t1 at which these are acquired, the data amount of the communication packets input to the transmission buffer 13 during the period from the time t1 to the time t2, and the data amount of the communication packets accumulated in the transmission buffer 13 at time t2 (S4, corresponding to an upstream buffer delay time estimation process), and ends the estimation process of the upstream buffer delay time.

Figures 9, 10:
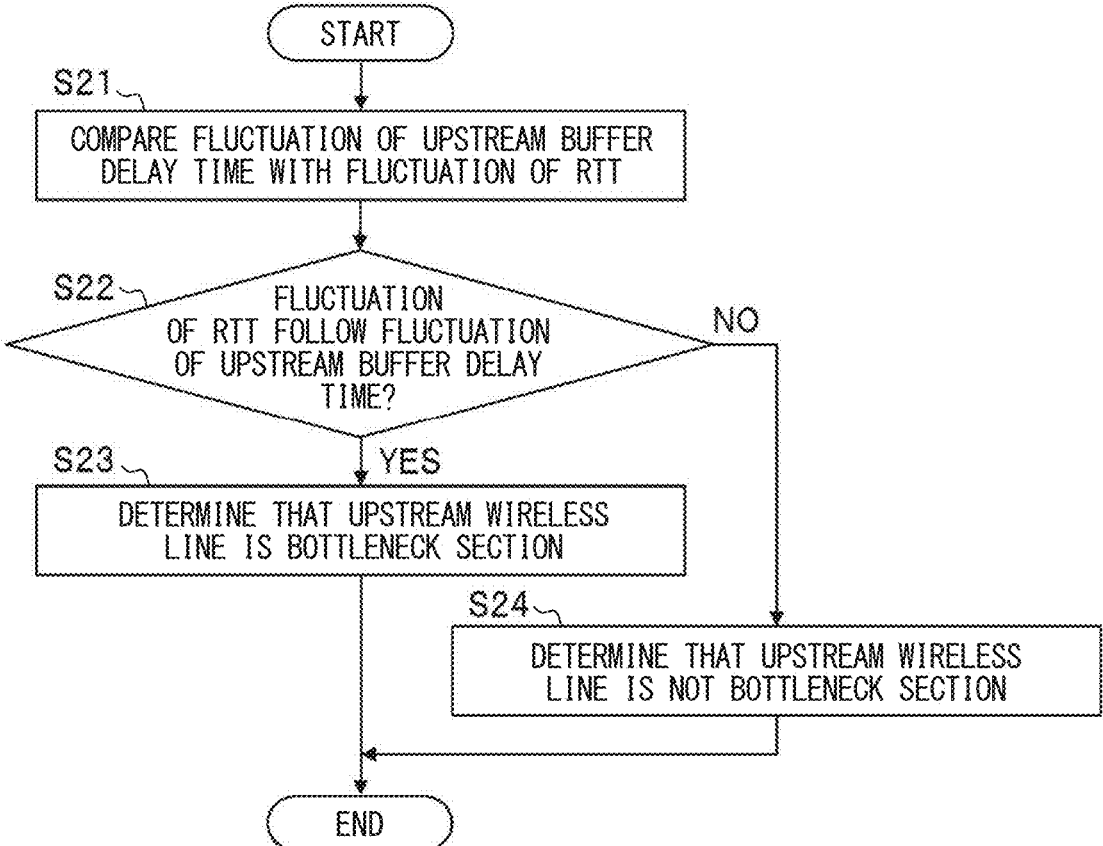
FIG. 9 is a flowchart showing an estimation process of the downstream buffer delay time.
FIG. 10 is a flowchart showing an influence determination process of an upstream wireless line.

(2) Estimation Process for Downstream Buffer Delay Time (See FIG. 9)

When the controller 4 starts the estimation process of the downstream buffer delay time, it acquires the RTT, which is the sum of the upstream line delay and the downstream line delay (S11, corresponding to a RTT acquisition process). The controller 4 acquires the default delay time that is not affected by the fluctuation in the wireless environment and that has been measured in advance (S12, corresponding to a default delay time acquisition process). The controller 4 estimates the upstream buffer delay time in the downstream direction based on the upstream buffer delay time acquired by the estimation process of the upstream buffer delay time described above, the acquired RTT, and the default delay time using the above-described calculation equation (S13, corresponding to a downstream buffer delay time estimation process), and ends the estimation process of the downstream buffer delay time.

(3) Influence Determination Process for Upstream Wireless Line (See FIG. 10)

When the controller 4 starts the influence determination process for the upstream wireless line, it compares the fluctuation of the upstream buffer delay time with the fluctuation of the RTT (S21) and determines whether the fluctuation of the RTT follows the fluctuation of the upstream buffer delay time (S22). When the controller 4 determines that the fluctuation in the RTT follow the fluctuation in the upstream buffer delay time (S22: YES), it determines that the upstream wireless line is affecting the rate limit of the entire communication line, i.e., the upstream wireless line is the bottleneck section (S23), and ends the influence determination process for the upstream wireless line. On the other hand, when the controller 4 determines that the fluctuation in the RTT does not follow the fluctuation in the upstream buffer delay time (S22: NO), it determines that the upstream wireless line is not affecting the rate limit of the entire communication line, i.e., the upstream wireless line is not the bottleneck section (S24), and ends the influence determination process for the upstream wireless line.

The above-described embodiment can provide the following operational effects. The communication node 2 estimates the residence time of the communication packet input to the transmission buffer 13 as the upstream buffer delay time based on the data amount of the communication packets accumulated in the transmission buffer 13 at the acquired time t1, the data amount of the communication packets input to the transmission buffer 13 during the period from time t1 to time t2, and the data amount of the communication packets accumulated in the transmission buffer 13 at time t2. It is possible to appropriately estimate the line delay time in the upstream direction from the communication node 2 to the counterpart node 3.

The RTT, which is the sum of the upstream line delay and the downstream line delay, is acquired, the default delay time that is not affected by the fluctuation of the wireless environment is acquired, and the downstream buffer delay time is estimated by subtracting the sum of the upstream buffer delay time and the default delay time from the acquired RTT. It is possible to appropriately estimate the line delay time in the downstream direction from the counterpart node 3 to the communication node 2.

In the period during which the fluctuation of the RTT follows the fluctuation of the upstream buffer delay time, the upstream wireless line is affecting the rate limit of the entire communication line, and the upstream wireless line is identified as the bottleneck section. It is possible to determine that suppressing delay in the transmission buffer 13 is effective in improving the RTT, and adjust the RTT by adjusting the input rate to the transmission buffer 13.

In the period in which the fluctuation of the RTT does not follow the fluctuation of the upstream buffer delay time, the upstream wireless line does not affect the rate limit of the entire communication line, and the upstream wireless line is identified as not being the bottleneck section. It is possible to determine that suppressing delay in the transmission buffer 13 is effective in improving the RTT, and adjust the RTT by avoiding a situation in which the input rate to the transmission buffer 13 is unnecessarily adjusted.

Although the present disclosure has been made in accordance with the embodiments, it is understood that the present disclosure is not limited to such embodiments and configurations. The present disclosure also includes various modification examples and modifications within an equivalent range. Furthermore, various combinations and formations, and other combinations and formations including one, more than one or less than one element may be included in the scope and the spirit of the present disclosure.

The controller and the method thereof described in the present disclosure may be implemented by a dedicated computer configured by a processor and a memory programmed to execute one or more functions embodied by a computer program. Alternatively, the controller and the method thereof described in the present disclosure may be implemented by a dedicated computer configured by a processor including one or more dedicated hardware logic circuits. Alternatively, the controller and the method thereof described in the present disclosure may be implemented by one or more dedicated computers configured by a combination of (i) a processor and a memory programmed to execute one or more functions and (ii) a processor including one or more hardware logic circuits. The computer program may be stored in a computer-readable non-transitory tangible storage medium as an instruction to be executed by the computer.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

The invention claimed is:

1. A communication device configured to transmit a communication packet to a counterpart device, the communication device comprising:

a transmission buffer configured to accumulate the communication packet; and at least one of (i) a circuit and (ii) a processor with a memory storing computer program code executable by the processor or the circuit, the at least one of the circuit and the processor configured to cause the communication device to:

monitor a data amount of the communication packet accumulated in the transmission buffer;

monitor the data amount of the communication packet input to the transmission buffer in a predetermined period; and estimate, as an upstream buffer delay time from the communication device to the counterpart device, a residence time, which is a duration for which the communication packet input to the transmission buffer remains in the transmission buffer, based on a data amount of the communication packet accumulated in the transmission buffer at a first time, a data amount of the communication packet input to the transmission buffer during a period from the first time to a second time, and a data amount of the communication packet accumulated in the transmission buffer at the second time.

2. The communication device according to claim 1, wherein the at least one of the circuit and the processor is configured to estimate a downstream buffer delay time from the counterpart device to the communication device based on the upstream buffer delay time.

3. The communication device according to claim 2, wherein the at least one of the circuit and the processor is configured to acquire: a round-trip time that is a sum of an upstream line delay and a downstream line delay; and a default delay time, and estimate the downstream buffer delay time by subtracting a sum of the upstream buffer delay time and the default delay time from the acquired round-trip time.

4. The communication device according to claim 1, wherein the at least one of the circuit and the processor is configured to acquire a round-trip time that is a sum of an upstream line delay and a downstream line delay, compare fluctuation of the upstream buffer delay time and fluctuation of the round-trip time, and determine whether an upstream wireless line is affecting a rate limit of an entire communication line.

5. The communication device according to claim 4, wherein the at least one of the circuit and the processor is configured to determine that the upstream wireless line is affecting the rate limit of the entire communication line during a period in which the fluctuation of the round-trip time follows the fluctuation of the upstream buffer delay time.

6. The communication device according to claim 4, wherein the at least one of the circuit and the processor is configured to determine that the upstream wireless line is not affecting the rate limit of the entire communication line during a period in which the fluctuation of the round-trip time does not follow the fluctuation of the upstream buffer delay time.

7. A line delay time estimation method comprising causing a communication device, which is configured to transmit a communication packet to a counterpart device, to:

acquire a data amount of the communication packet accumulated in a transmission buffer at a first time;

acquire a data amount of the communication packet input to the transmission buffer during a period from the first time to a second time;

acquire a data amount of the communication packet accumulated in the transmission buffer at the second time; and estimate, as an upstream buffer delay time from the communication device to the counterpart device, a residence time, which is a duration for which the communication packet input to the transmission buffer remains in the transmission buffer, based on the data amount of the communication packet accumulated in the transmission buffer at the first time, the data amount of the communication packet input to the transmission buffer during the period from the first time to the second time, and the data amount of the communication packet accumulated in the transmission buffer at the second time.

8. The line delay time estimation method according to claim 7, further causing the communication device to:

acquire a round-trip time that is a sum of an upstream line delay and a downstream line delay;

acquire a default delay time that is not affected by fluctuation of a wireless environment in a communication line; and estimate a downstream buffer delay time from the counterpart device to the communication device, based on the upstream buffer delay time, the acquired round-trip time, and the acquired default delay time.

9. A non-transitory computer-readable storage medium storing a line delay time estimation program causing a controller of a communication device, which is configured to transmit a communication packet to a counterpart device, to:

acquire a data amount of the communication packet accumulated in a transmission buffer at a first time;

acquire a data amount of the communication packet input to the transmission buffer during a period from the first time to a second time;

acquire a data amount of the communication packet accumulated in the transmission buffer at the second time; and estimate, as an upstream buffer delay time from the communication device to the counterpart device, a residence time, which is a duration for which the communication packet input to the transmission buffer remains in the transmission buffer, based on the data amount of the communication packet accumulated in the transmission buffer at the first time, the data amount of the communication packet input to the transmission buffer during the period from the first time to the second time, and the data amount of the communication packet accumulated in the transmission buffer at the second time.

10. The non-transitory computer-readable storage medium storing the line delay time estimation program according to claim 9, the program further causing the controller to:

acquire a round-trip time that is a sum of an upstream line delay and a downstream line delay;

acquire a default delay time that is not affected by fluctuation of a wireless environment in a communication line; and estimate a downstream buffer delay time from the counterpart device to the communication device, based on the upstream buffer delay time, the acquired round-trip time, and the acquired default delay time.

\* \* \* \* \*